United States Patent
Zhu et al.

(10) Patent No.: US 8,275,329 B2
(45) Date of Patent: *Sep. 25, 2012

(54) MOBILE WIRELESS COMMUNICATIONS DEVICE WITH REDUCED HARMONICS RESULTING FROM METAL SHIELD COUPLING

(75) Inventors: Lizhong Zhu, Waterloo (CA); George Mankaruse, Kitchener (CA); Michael Corrigan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,099

(22) Filed: Dec. 14, 2011

(65) Prior Publication Data

US 2012/0100819 A1    Apr. 26, 2012

Related U.S. Application Data (63) Continuation of application No. 12/117,036, filed on May 8, 2008, now Pat. No. 8,099,064.

(51) Int. Cl.
 *H04B 1/04* (2006.01)
 *H04B 1/10* (2006.01)
(52) U.S. Cl. ............ 455/114.2; 455/301; 455/311
(58) Field of Classification Search ............ 455/550.1, 455/575.1, 129, 78, 82, 83, 296, 300, 301, 455/114.2, 311
See application file for complete search history.

(56) References Cited

U.S. PATENT DOCUMENTS

| | | | |
|---|---|---|---|
| 4,187,481 A | 2/1980 | Boutros | 333/182 |
| 4,794,353 A | 12/1988 | Broyde | 333/167 |
| 5,165,055 A | 11/1992 | Metsler | 333/12 |
| 5,333,205 A | 7/1994 | Bogut et al. | 381/172 |
| 5,621,363 A | 4/1997 | Ogden et al. | 333/12 |
| 5,633,786 A | 5/1997 | Matuszewski et al. | 361/818 |
| 5,682,418 A | 10/1997 | Ide | 455/575.1 |
| 5,764,693 A | 6/1998 | Taylor et al. | 375/222 |

(Continued)

FOREIGN PATENT DOCUMENTS

EP    0279137    8/1988

(Continued)

OTHER PUBLICATIONS

Mun et al., "Design of Harmonic Filter and Antenna Switch for Two-Way Mobile Radio," 2006 International RF and Microwave Conference Proceedings, Sep. 12-14, 2006, pp. 36-38.

*Primary Examiner* — Nguyen Vo
(74) *Attorney, Agent, or Firm* — Allen, Dyer, Doppelt, Milbrath & Gilchrist, P.A.

(57) ABSTRACT

A mobile wireless communications device includes a housing, antenna, and circuit board carried by the housing and having radio frequency (RF) circuitry operative with the antenna for receiving and transmitting RF signals through the antenna. A power amplifier is connected within a transmission line for amplifying RF signals to be transmitted over the transmission line to the antenna. An antenna switch is connected to the antenna and RF circuitry. An RF shield surrounds the power amplifier and antenna switch and isolates the power amplifier and antenna switch from the antenna and RF circuitry. A low pass filter is connected to the power amplifier and antenna switch for reducing any RF coupling of voltage standing waves of upper harmonic frequencies from the power amplifier into the antenna switch through the RF shield while maintaining transmission of signals through the transmission line at a desired fundamental frequency.

19 Claims, 8 Drawing Sheets

U.S. PATENT DOCUMENTS

| | | | |
|---|---|---|---|
| 5,911,121 A | 6/1999 | Andrews | 455/418 |
| 5,937,361 A | 8/1999 | Smith | 455/575 |
| 5,963,588 A | 10/1999 | Yatim et al. | 375/222 |
| 6,108,415 A | 8/2000 | Andrea | 379/433.03 |
| 6,307,944 B1 | 10/2001 | Garratt et al. | 381/312 |
| 6,397,044 B1 | 5/2002 | Nash et al. | 455/73 |
| 6,594,155 B2 | 7/2003 | Kuroda | 361/807 |
| 6,628,508 B2 | 9/2003 | Lieu et al. | 361/680 |
| 6,647,367 B2 | 11/2003 | McArthur et al. | 704/226 |
| 7,027,841 B2 | 4/2006 | Ishii | 455/569.1 |
| 7,310,067 B1 | 12/2007 | Zhu et al. | 343/702 |
| 8,099,064 B2 * | 1/2012 | Zhu et al. | 455/114.2 |
| 2004/0217914 A1 | 11/2004 | Yamashita et al. | 343/850 |
| 2005/0099228 A1 | 5/2005 | Akatsuka et al. | 330/66 |
| 2005/0123025 A1 | 6/2005 | Sorrells et al. | 375/130 |
| 2006/0046770 A1 | 3/2006 | Zhu et al. | 455/550.1 |
| 2006/0068856 A1 | 3/2006 | Zhu et al. | 455/575.1 |
| 2006/0120499 A1 | 6/2006 | Simmons et al. | 375/368 |
| 2007/0273602 A1 | 11/2007 | Zhu et al. | 343/841 |
| 2009/0280757 A1 | 11/2009 | Zhu et al. | 455/114.1 |

FOREIGN PATENT DOCUMENTS

| | | |
|---|---|---|
| EP | 0856977 | 8/1998 |
| WO | 2004/086587 | 10/2004 |

* cited by examiner

MOBILE WIRELESS COMMUNICATIONS DEVICE WITH REDUCED HARMONICS RESULTING FROM METAL SHIELD COUPLING

FIELD OF THE INVENTION

This application is a continuation of Ser. No. 12/117,036 filed May 8, 2008, now U.S. Pat. No. 8,099,064 issued Jan. 17, 2012, the disclosure of which is hereby incorporated by reference in its entirety.

BACKGROUND OF THE INVENTION

Cellular communication systems continue to grow in popularity and have become an integral part of both personal and business communications. Cellular telephones allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

As the functionality of cellular communications devices continues to increase, so too does demand for smaller devices that are easier and more convenient for users to carry. As any circuit boards and electronic components thereon are reduced in size and placed closer together, including antenna and other RF components, including power amplifiers and antenna switches, various electronic components can pick up conductive energy and create interference within the system. For example, some components could pick up conducted energy directly from a power amplifier or from the radiated energy emitted by an antenna. This unwanted reception of conducted/near field radiated energy from power amplifiers and antennae is particularly problematic in a packet burst transmission as part of a Global System for Mobile communications (GSM) system, including the 450 MHz, 900 MHz, 1800 MHz and 1900 MHz frequency bands.

Some mobile wireless communications devices have an RF metal shield also termed a "can" that forms a compartment on a circuit board and receives RF circuitry therein, for example, the power amplifier and antenna switch, typically a diplexer antenna switch also termed a transmit/receiver antenna switch. One or more RF shields as metallic "cans" can form radio frequency isolation compartments that may include a transceiver chip set in one "can" and the power amplifier and antenna switch in another "can" to aid RF filtering between the RF power amplifier and the antenna switch. Some signal coupling through the RF shield as created from voltage standing waves of single or multiple harmonics, thus bypassing various components such as filters that are formed to prevent such coupling.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Typically, a low pass filter exists between the power amplifier and antenna switch. An RF shield such as a metallic "can" encases the power amplifier and antenna switch and includes therein a three-pole LC filter in the middle of the power amplifier and antenna switch transmission line. In the tight physical space under the RF "can", the transmission line can be mismatched at harmonic frequencies and create significant standing waves. The RF shield couples the RF harmonics from a power amplifier output directly to the antenna switch input, causing problems such that signals bypass any low pass filter. This RF coupling because of the RF shield is created by the high RF voltage standing wave ratio (VSWR).

In accordance with one non-limiting aspect, a mobile wireless communications device includes a housing and antenna supported by the housing. A circuit board is carried by the housing and has radio frequency (RF) circuitry operative with the antenna for receiving and transmitting RF signals through the antenna. A power amplifier is connected within a transmission line for amplifying RF signals to be transmitted over the transmission line to the antenna. An antenna switch is carried by a circuit board and connected to the antenna for switching between receiving and transmitting RF signals to the antenna. An RF shield surrounds the power amplifier and antenna switch for isolating the power amplifier and antenna switch from the antenna and RF circuitry. In accordance with a non-limiting example, a low pass filter is formed within the transmission line and has an input connected to the power amplifier and an output connected to the antenna switch for reducing any RF coupling of voltage standing waves of upper harmonic frequencies from the power amplifier into the antenna switch between the input and output of the low pass filter through the RF shield while maintaining transmission of signals through the transmission line at a desired fundamental frequency.

In one aspect, a low pass filter can be formed as an RLC filter and formed using a capacitor and first resistor connected in a series and an inductor and second resistor connected in parallel. The low pass filter could also include a grounded resistor in series with a first capacitor and a grounded second capacitor in parallel with the first capacitor. The values for each capacitor, resistor inductor can be chosen such that at a fundamental frequency, the impedance of the capacitance is higher than the first resistor, and the impedance of the inductor is lower than the second resistor. At higher harmonic frequencies, the impedance of the capacitor is reduced and the first resistor becomes a dominant element for reducing any RF coupling of voltage standing waves of upper harmonic frequencies from the power amplifier into the antenna switch between the input and output of the low pass filter through the RF shield while maintaining transmission of signals through the transmission line at a desired fundamental frequency.

In another aspect, the RF shield is formed as a metal housing secured to a circuit board and surrounding the power amplifier and antenna switch, which can be positioned within an isolation compartment on the circuit board. The RF shield surrounds the power amplifier and antenna switch and can be positioned over the isolation compartment and secured to the circuit board. The RF circuitry can be operative for generating Global System for Mobile (GSM) packet bursts. The RF circuitry can be formed as a transceiver chip set.

A method aspect is also set forth.

Figure 1:
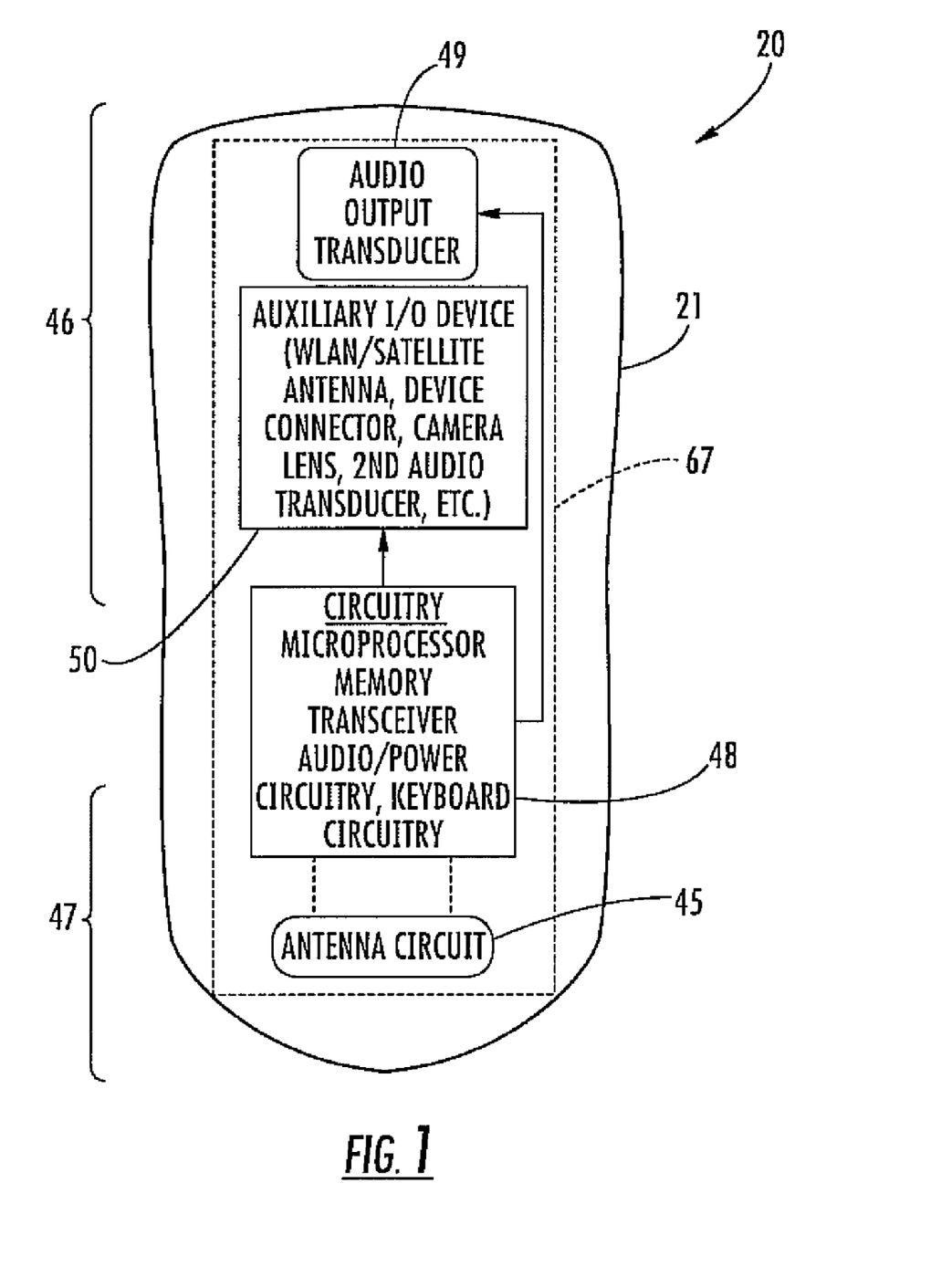
FIG. 1 is a schematic block diagram of an example of a mobile wireless communications device configured as a handheld device and illustrating basic internal components thereof.
Figure 2:
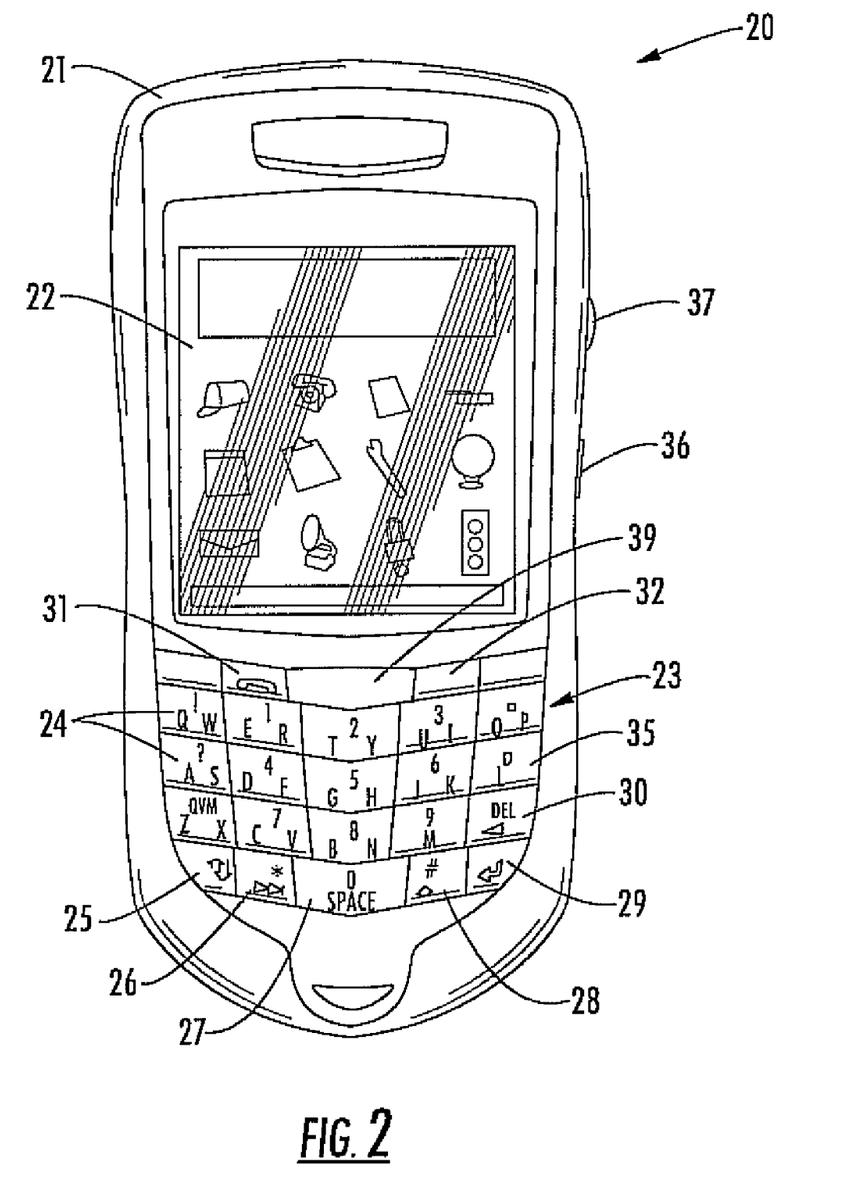
FIG. 2 is a front elevation view of the mobile wireless communications device of FIG. 1.
Figure 3:
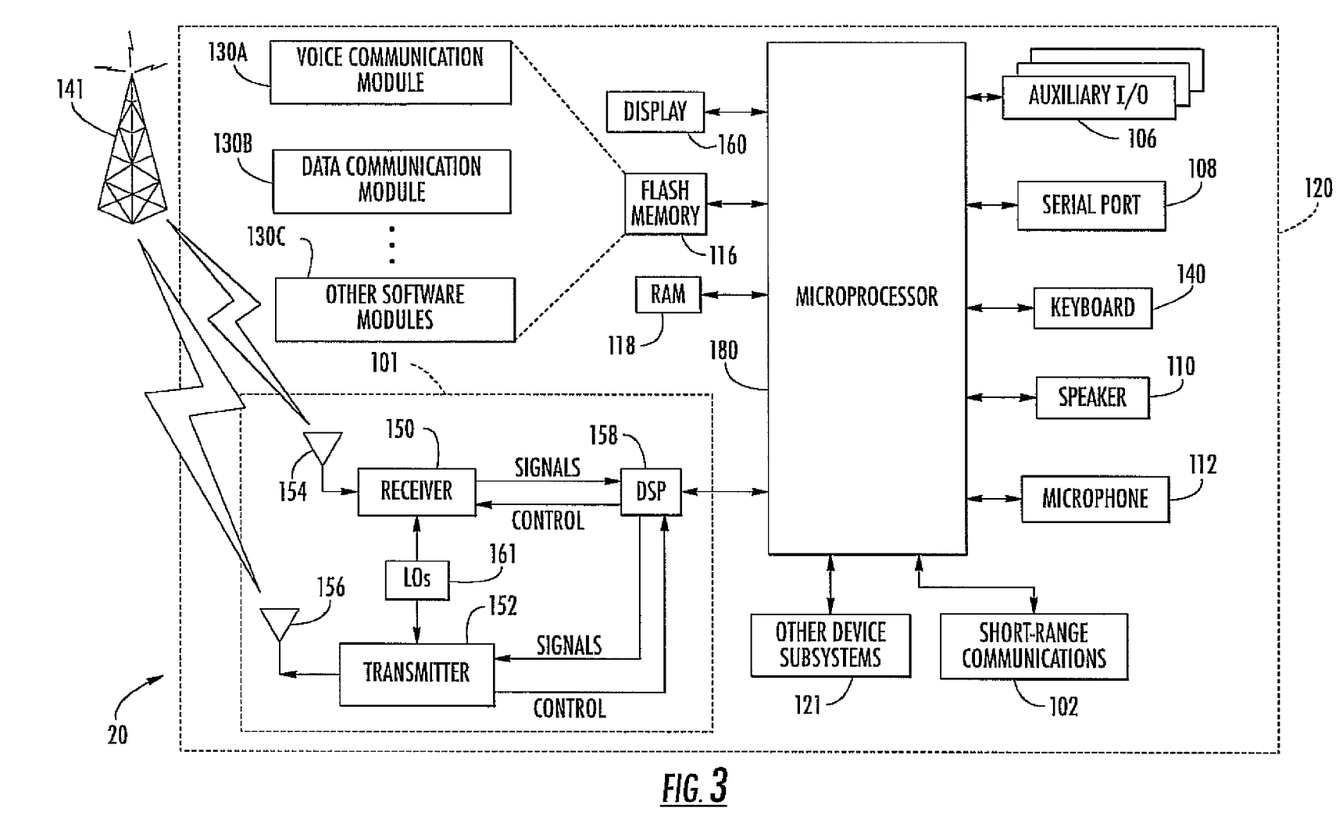
FIG. 3 is a schematic block diagram showing basic functional circuit components that can be used in the mobile wireless communications device of FIGS. 1-2.

A brief description will now proceed relative to FIGS. 1-3, which disclose an example of a mobile wireless communications device, for example, a handheld portable cellular radio, which can incorporate the non-limiting examples of the various circuits as later described. FIGS. 1-3 are representative non-limiting examples of the many different types of functional circuit components and their interconnection, and operative for use with the circuits as described.

Referring initially to FIGS. 1 and 2, an example of a mobile wireless communications device 20, such as a handheld portable cellular radio that can incorporate the low pass filter as described below is set forth. This device 20 illustratively includes a housing 21 having an upper portion 46 and a lower portion 47, and at least one dielectric substrate (i.e., circuit board) 67, such as a conventional printed circuit board (PCB) substrate, for example, carried by the housing. A number of different circuit boards can be used for supporting different components. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, but it should be understood that a flip or sliding housing can be used as is typical in many cellular and similar telephones. These and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. This circuitry could also generally be termed RF circuitry. It should be understood that keyboard circuitry could be on a separate keyboard, etc., as will be appreciated by those skilled in the art. The different components as described can also be distributed on one circuit board or among a plurality of circuit boards. A battery (not shown) is also preferably carried by the housing 21 for supplying power to the circuitry 48. The term RF circuitry could encompass the interoperable RF transceiver circuitry, including receive and transmit circuits and power circuitry and audio circuitry.

In one aspect, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the RF circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 is preferably supported within the housing and in one aspect at a lower portion 47 in the housing. The antenna can be formed as a pattern of conductive traces that make an antenna circuit, which physically forms the antenna. It is operatively connected to the circuitry 48 on the main circuit board 67. In one non-limiting example, the antenna could be formed on an antenna circuit board section that extends from the circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used.

More particularly, a user will typically hold the upper portion of the housing 21 very close to their head so that the audio output transducer 49 is directly next to the ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

In some designs, the antenna 45 is placed adjacent the lower portion 47 of the housing 21 to allow for less impact on antenna performance due to blockage by a user's hand. Users typically hold cellular phones towards the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Another benefit of this type of configuration is that it provides more room for one or more auxiliary input/output (I/O)

devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "n", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. The letters on the keypad 23 are presented in a three-row format, with the letters of each row being in the same order and relative position as in a standard QWERTY keypad.

Each row of keys (including the fourth row of function keys 25-29) is arranged in five columns in this non-limiting example. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, in one non-limiting example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used. A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 4:
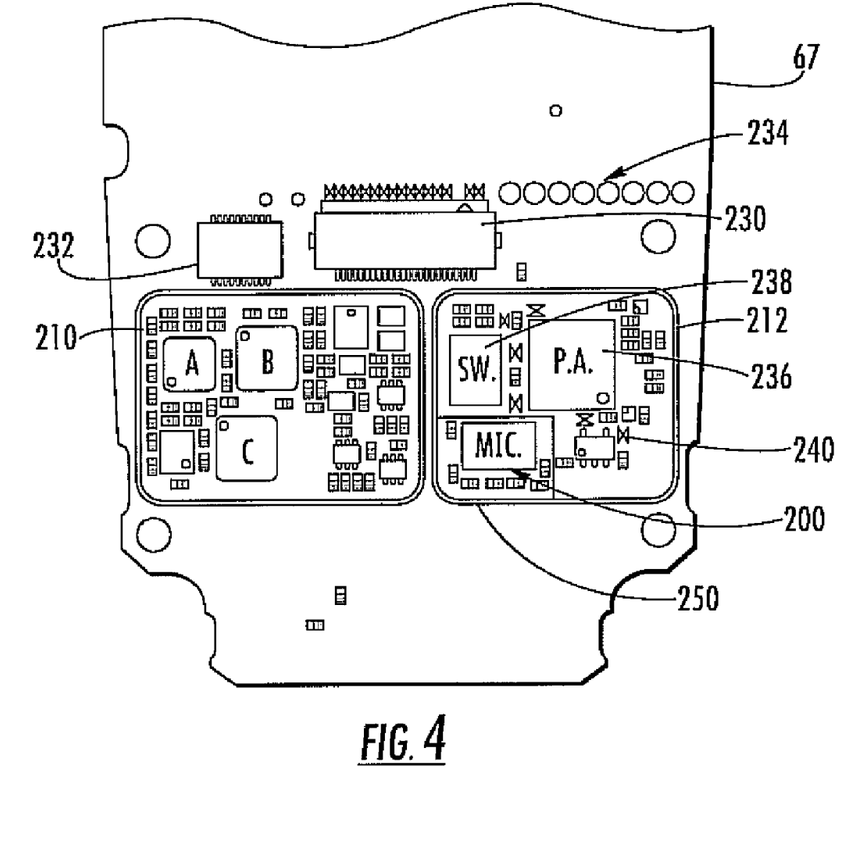
FIG. 4 is front elevational view of the mobile wireless communications device in accordance with one embodiment having the front cover removed to illustrate an example of RF circuitry, power amplifier, surface mounted microphone and noise isolation components associated thereof.

In accordance with a non-limiting example, FIG. 4 shows an example of a circuit layout on part of the circuit board 67 that can be included within the mobile wireless communications device 20 of FIGS. 1-3, and showing a front cover removed from a housing to illustrate a surface mounted microphone 200 and its circuitry and associated noise isolation components as will be explained in greater detail below. The circuit board 67 includes the radio frequency (RF) circuitry 48, for example, cellular telephone communications circuitry, which is mounted in first and second isolation shields or "cans" 210,212, as often called by those skilled in the art, forming a compartment on the circuit board, each which receive the RF circuitry. Each can 210,212 forms a radio frequency isolation compartment and may include sides and a top. The first can 210 in one non-limiting example includes a transceiver chip set 220, for example, a transmitter chip, receiver chip, and local oscillator chip as non-limiting examples with those chips labeled A, B and C. Other illustrated components could include the various resistors, capacitors, amplifiers, regulators and other circuit components common to those devices, but not explained in detail.

Located outside first and second isolation cans 210,212, in this non-limiting example but mounted on the circuit board 67, is a liquid crystal display (LCD) connector 230 and a keyboard connector 232, as well as associated circuit components 234. These components 230, 232 and 234 can be configured in different configurations besides the configuration illustrated in the non-limiting example of FIG. 4. The compartment within the second isolation can 212 includes a power amplifier 236 and switch diplexer 238 as an antenna switch through which RF signals are transmitted and received and connected by a transmission line with the low pass filter as described in greater detail below. Other components 240 are mounted within the compartment and form the resistors, capacitors, transistors, and inductors necessary to drive the audio and power circuits for the microphone, power amplifier and other RF circuits.

In one non-limiting example, a radio frequency isolation shield, formed in the illustrated non-limiting example as a third isolation "can" 250, is positioned at a corner of the second "can" 212, and forms another isolation compartment at this corner to provide microphone isolation. The RF shield 212 in one aspect is formed as a separate metallic housing secured to the circuit board. The smaller RF shield 250 surrounds the microphone, effectively covering, i.e., shielding the entire microphone. That shield can be similarly formed to other shields. Although a "can" configuration formed as a metallic housing with top and sides is used for the RF shields 210, 212, other configurations could be used. Each RF shield as a metallic "can" forms a compartment on the circuit board in one non-limiting example.

As noted before relative to the description of FIG. 4, the power amplifier 236 and switch 238 are contained within the RF metal shield 212 forming a can to isolate the power amplifier and switch.

Figure 5:
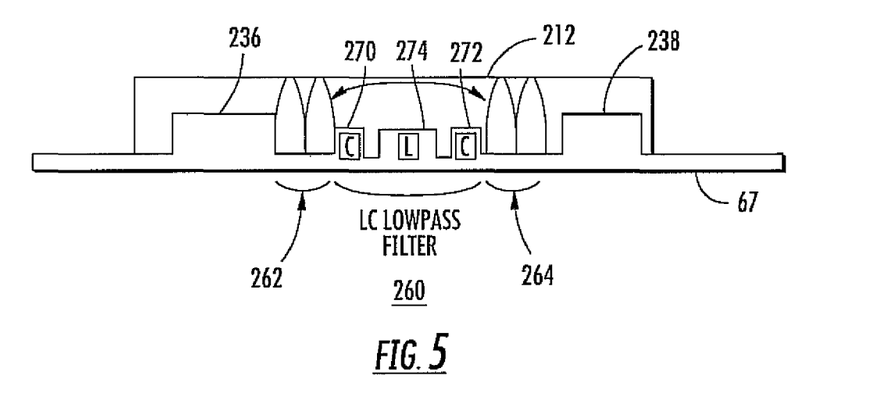
FIG. 5 is a fragmentary, side elevation view showing the RF shield on the printed circuit board and showing in schematic representation the RF coupling between the input and output of a typical LC low pass filter via the RF shield because of standing waves at harmonic frequencies.
Figure 6:
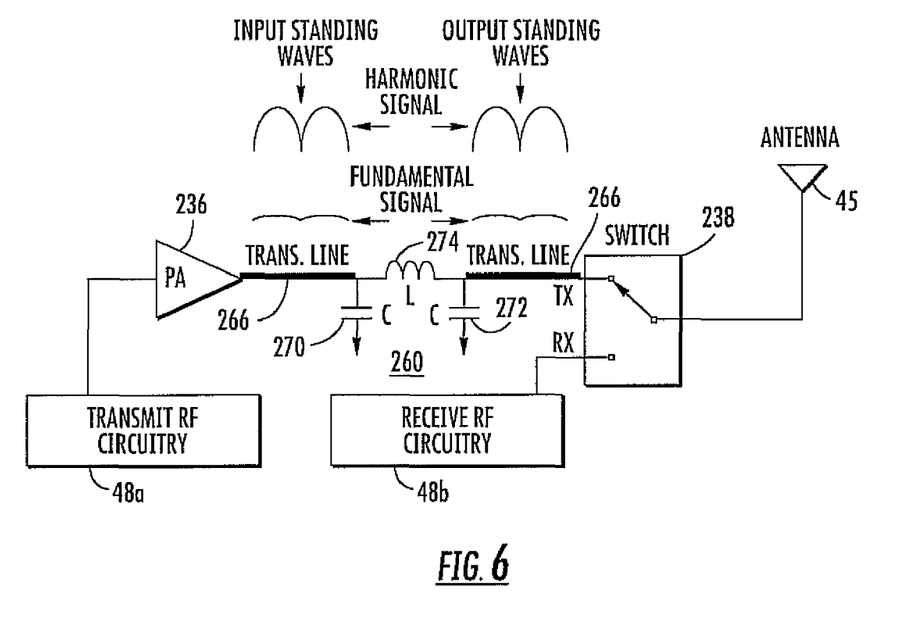
FIG. 6 is a schematic circuit diagram of the circuit shown in FIG. 5 and showing a typical LC low pass harmonic filter and the input and output standing waves resulting from a mismatch at harmonic frequencies.

FIG. 5 is the fragmentary drawing representation looking in a side elevation view and showing the "can" 212 and a typical LC low pass filter 260 that includes an input 262 and output 264 as input and output transmission lines that form the transmission line 266 between the power amplifier 236 and antenna switch 238 as positioned on the printed circuit board 67. As shown in FIG. 6, the RF circuitry can include transmit RF circuitry 48A and receive RF circuitry 48B that connect to the switch 238. The transmit RF circuitry 48A includes the transmission line 266 to which the power amplifier 236 connects. The LC low pass filter 260 is connected into the transmission line 266 between the power amplifier 236 and antenna switch 238 and is formed as first and second parallel capacitors 270, 272, and a series connected inductor 274 in-line with the transmission line 266.

The LC low pass filter 260 shown in FIG. 5 and FIG. 6 is implemented to provide RF filtering between the RF power amplifier 236 and the antenna switch 238, that operating typically as a transmit and receive antenna switch. This filter is typically designed as a 3-pole LC filter as shown in the middle of the transmission line 266. These components are placed in a tight physical space under the RF shield 212 and this transmission line 266 often can be mismatched at harmonic frequencies and create a significant standing wave.

It should be understood that the standing wave ratio (SWR) is a ratio of the amplitude of a partial standing wave at an antinode (maximum) to the amplitude and adjacent node (minimum) in the transmission line. It is usually a voltage ratio called the voltage standing wave ratio (VSWR). There is typically a forward wave with an amplitude superimposed on a reflected wave. These reflections occur because of discontinuities, for example, imperfections in the transmission line or termination points with other than a characteristic impedance. Sometimes two waves can interfere constructively. The SWR is an indicator of the reflected waves bouncing back and forth within a transmission line and could correspond to an increase in power in the line beyond the actual transmitted power and create an increase in RF losses as the increased voltage increases dielectric losses, and the increased current increases resistive losses. Of course, a matched impedance gives an ideal power transfer while mismatched impedances give high SWR and increased losses in the transmission line. Usually, some reflected power in the transmission line is reflected back at the transmitter and radiated by the antenna. Typically, a Smith chart showing a graph can express the reflection coefficient such that a magnitude of zero is a perfect match, and a value of one is a perfect reflection in some non-limiting examples. Of course, the reflection coefficient can distinguish between short and open circuits where a short circuit has a value of −1 while an open circuit has an angle of zero degrees. The return loss of a load with a magnitude of the reflection coefficient is typically expressed in decibels. Return loss is typically a positive number.

Figure 7:
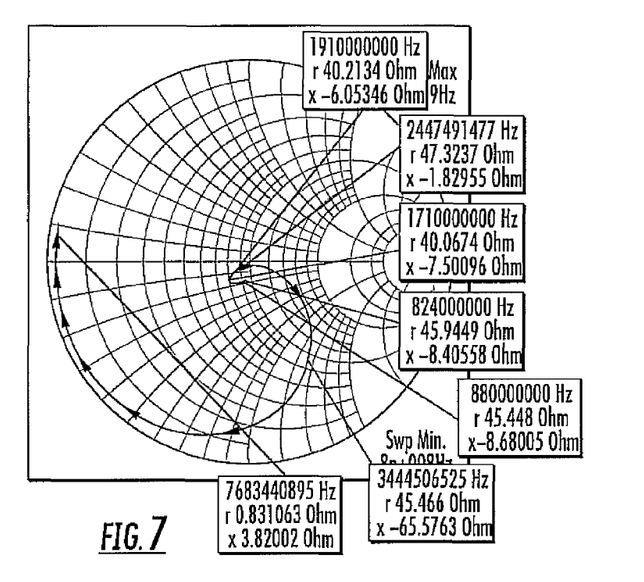
FIG. 7 is a graph showing the corresponding return loss and plot of an LC low pass harmonic filter over fundamental and harmonic frequencies for the circuit of FIGS. 5 and 6.
Figure 8:
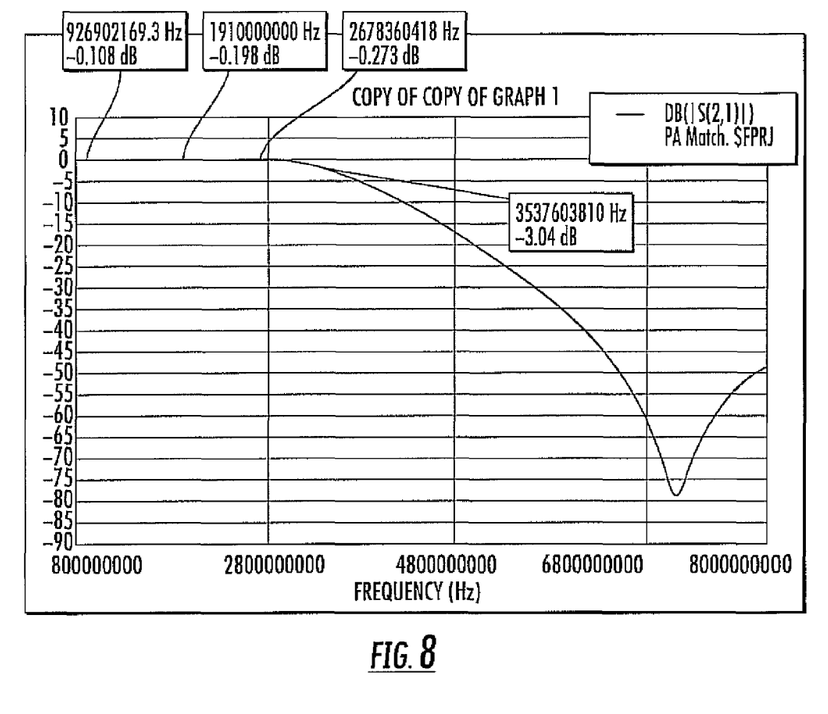
FIG. 8 is a graph showing a corresponding insertion loss plot of an LC low pass harmonic filter over fundamental and harmonic frequencies for the circuit of FIGS. 5 and 6.

As a result, because of the standing waves, the RF shield 212 couples the RF harmonics from the power amplifier 236 output directly to the switch input 238 and bypasses the low pass filter 260. This RF coupling is created by the high RF voltage standing wave ratio (VSWR) such as shown in the Smith chart of FIG. 7. The graph shows the corresponding return loss (S11) plot of the LC low pass harmonic filter 260 over fundamental and harmonic frequencies. FIG. 8 is a graph showing the corresponding insertion loss (S21) plot of the same LC low pass harmonic filter 260 over fundamental and harmonic frequencies. FIG. 6 shows the input standing waves and output standing waves as part of the harmonic signal and the fundamental signal.

Figure 9:
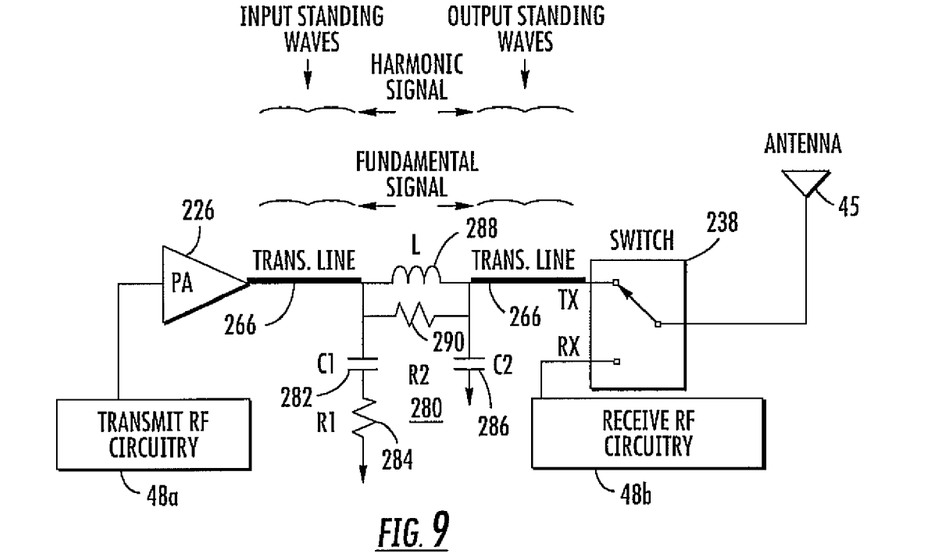
FIG. 9 is a schematic circuit diagram showing an RLC low pass harmonic filter that results in an improvement of input and output standing waves at harmonic frequencies.
Figure 10:
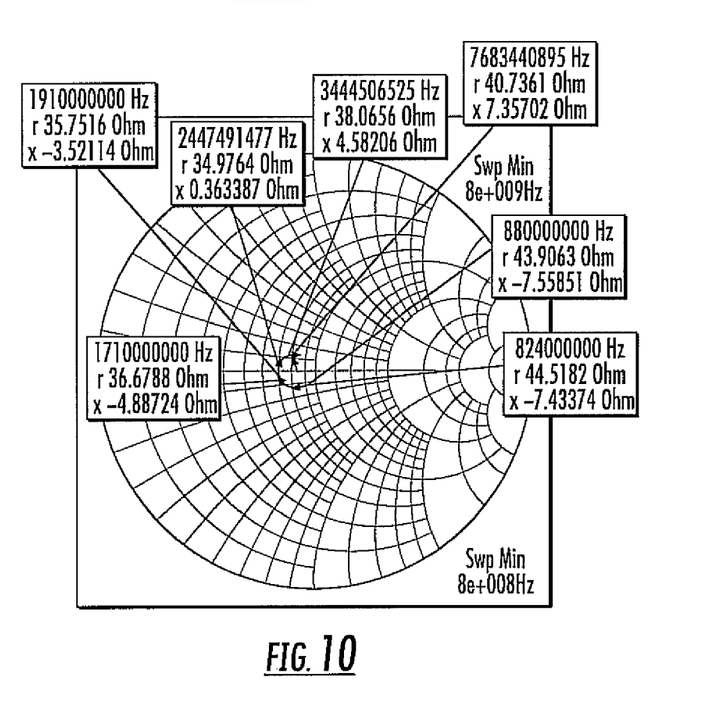
FIG. 10 is a graph showing the corresponding return loss plot of the RLC low pass harmonic filter over fundamental and harmonic frequencies based upon the circuit shown in FIG. 9.
Figure 11:
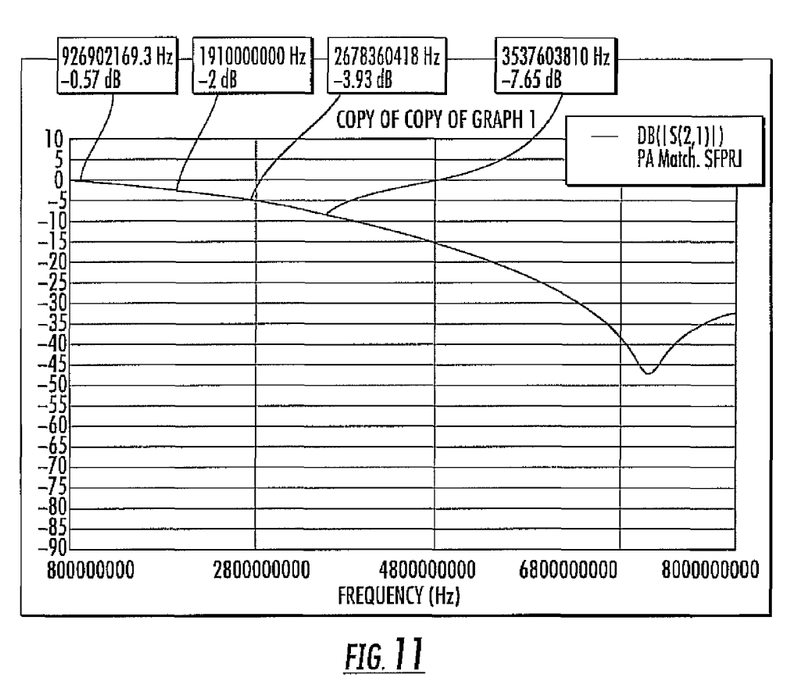
FIG. 11 is a graph showing the corresponding insertion loss plot of the RLC low pass harmonic filter over fundamental and harmonic frequencies.

In accordance with the non-limiting example, FIG. 9 shows a low pass filter that solves the technical problem addressed above by using an RLC lossy low pass filter 280 that significantly reduces the voltage standing wave ratio (VSWR) at harmonic frequencies, such as shown in the Smith chart of FIG. 10. The graph displays the corresponding return loss (S11) plot of the RLC low pass harmonic filter 280 over fundamental and harmonic frequencies. As illustrated, the RLC low pass filter 280 includes a first capacitor 282 series connected to a ground connected first resistor 284, which are in parallel with a second ground connected capacitor 286. The inductor 288 is serially connected within the transmission line 266. A second resistor 290 is connected in parallel to the inductor 288. These various components are selected to have resistance, capacitance, and inductance values such that at a fundamental frequency, the impedance of the capacitance established by the capacitors 282, 286 is higher than the first resistor 284 and the impedance of the inductor 288 is lower than the second resistor 290. At higher harmonic frequencies, the impedance of the capacitor 282 is reduced, and the first resistor 284 becomes a dominant element for reducing any RF coupling of voltage standing waves of upper harmonic frequencies from the power amplifier 226 into the antenna switch 238 between the input and output of the low pass filter 280 through the RF metal shield 212 while maintaining transmission of RF signals through the transmission line 266 at a desired fundamental frequency. R1 and R2 284, 290 have a minimum effect to the performance of the low pass filter, i.e., the insertion loss. At the higher harmonic frequencies, as noted before, the impedance of the first capacitor 282 is reduced significantly, and the first resistor 284 becomes the dominating element. The same is true relative to the second resistor 290, which is relatively lower in impedance than that of the inductor 288. Thus, the RLC low pass filter 280 as described becomes a more dissipative filter at its input, which results in a very low voltage standing wave ratio (VSWR) as shown in FIG. 10. The corresponding insertion loss (S21) plot of the RLC low pass harmonic filter 280 over fundamental and harmonic frequencies is shown in the graph of FIG. 11.

As a result, the RF shield no longer couples RF harmonics when the power amplifier output is directly output to the switch input.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device, comprising:
    an antenna;
    radio frequency (RF) circuitry operative with the antenna;
    a transmission line and power amplifier connected to the antenna;
    an antenna switch connected to said antenna and RF circuitry; and
    an RF shield surrounding said power amplifier and antenna switch for isolating said power amplifier and antenna switch from said antenna and RF circuitry, and further comprising a low pass filter within the transmission line and connected to said power amplifier and antenna switch, said low pass filter comprising a resistor, inductor and capacitor, wherein at a fundamental frequency, the impedance of the capacitor is higher than a first predetermined resistance and the impedance of the inductor is lower than a second predetermined resistance, and at higher harmonic frequencies, the impedance of the capacitor is reduced.

2. The mobile wireless communications device according to claim 1, wherein said low pass filter comprises a capacitor and first resistor connected in series and an inductor and second resistor connected in parallel.

3. The mobile wireless communications device according to claim 1, wherein said low pass filter comprises a resistor in series with a capacitor.

4. The mobile wireless communications device according to claim 1, wherein said RF shield comprises a metallic housing surrounding said power amplifier and antenna switch.

5. The mobile wireless communications device according to claim 4, and further comprising an isolation compartment in which said power amplifier and antenna switch are positioned.

6. The mobile wireless communications device according to claim 5, wherein said RF shield surrounding said power amplifier and antenna switch is positioned over said isolation compartment.

7. The mobile wireless communications device according to claim 1, wherein said RF circuitry is operative for generating Global System, for Mobile (GSM) packet bursts.

8. The mobile wireless communications device according to claim 1, wherein said RF circuitry comprises a transceiver chip set.

9. A mobile wireless communications device, comprising:
    an antenna;
    radio frequency (RF) circuitry operative with the antenna;
    a transmission line and a power amplifier connected to the antenna;
    an antenna switch connected to said antenna and RF circuitry; and
    an RF shield surrounding said power amplifier and antenna switch for isolating said power amplifier and antenna switch from said antenna and RF circuitry, and further comprising a low pass filter within the transmission line connected to said power amplifier and to said antenna switch, said low pass filter further comprising a capacitor and first resistor in series and an inductor and second resistor in parallel and having resistance, inductance, and capacitance values such that at a fundamental frequency the impedance of the capacitor is higher than the first resistor and the impedance of the inductor is lower than the second resistor and at higher harmonic frequencies the impedance of the capacitor is reduced and the first resistor becomes a dominant element.

10. The mobile wireless communications device according to claim 9, wherein said RF shield comprises a metallic housing surrounding said power amplifier and antenna switch.

11. The mobile wireless communications device according to claim 9, and further comprising an isolation compartment in which said power amplifier and antenna switch are positioned.

12. The mobile wireless communications device according to claim 11, wherein said RF shield surrounding said power amplifier and antenna switch is positioned over said isolation compartment.

13. The mobile wireless communications device according to claim 9, wherein said RF circuitry is operative for generating Global System for Mobile (GSM) packet bursts.

14. The mobile wireless communications device according to claim 9, wherein said RF circuitry comprises a transceiver chip set.

15. A method of operating a mobile wireless communications device, which comprises:
    providing an antenna and radio frequency (RF) circuitry operative with the antenna and a transmission line and power amplifier;
    switching between receiving and transmitting RF signals through the antenna using an antenna switch; and
    isolating the power amplifier and antenna switch from the antenna and RF circuitry by surrounding the power amplifier and antenna switch with an RF shield and reducing any RF coupling of Voltage Standing Waves of upper harmonic frequencies from the power amplifier into the antenna switch through the RF shield using a low pass filter positioned within the transmission line and formed from a resistor, inductor and capacitor wherein at a fundamental frequency, the impedance of the capacitor is higher than a first predetermined resistance and the impedance of the inductor is lower than a second predetermined resistance, and at higher harmonic frequencies, the impedance of the capacitor is reduced.

16. The method according to claim 15, which further comprises, forming a capacitor and first resistor in series and an inductor and second resistor in parallel.

17. The method according to claim 15, which further comprises, forming a resistor in series with a capacitor.

18. The method according to claim 15, which further comprises, generating Global System for Mobile (GSM) packet bursts using said RF circuitry.

19. The method according to claim 15, which further comprises, forming the RF circuitry as a RF chip set.

* * * * *